UNITED STATES PATENT OFFICE.

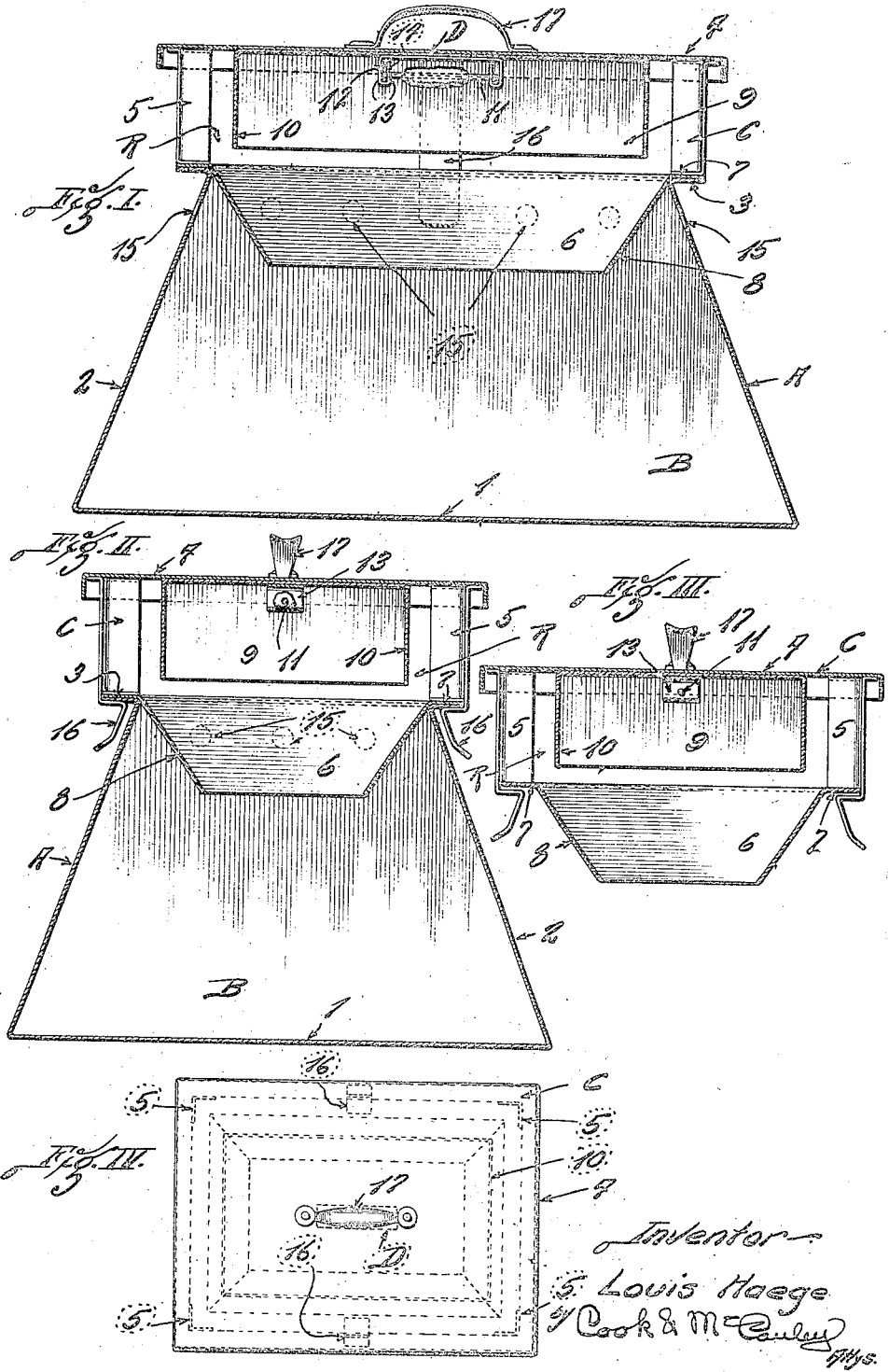

LOUIS HAEGE, OF NEW MEMPHIS, ILLINOIS.

RAT, MOUSE, AND INSECT TRAP.

1,379,685. Specification of Letters Patent. Patented May 31, 1921.

Application filed May 20, 1920. Serial No. 383,013.

*To all whom it may concern:*

Be it known that I, LOUIS HAEGE, a citizen of the United States of America, a resident of New Memphis, in the county of Clinton and State of Illinois, have invented certain new and useful Improvements in Rat, Mouse, and Insect Traps, of which the following is a full, clear, and exact description, reference being had to the accompanying drawings, forming a part of this specification.

My invention relates to traps for catching rats, mice and other small animals, and also for catching insects. The trap is adapted to allow these animals and insects to enter the trap easily and fall to the bottom of the trap in which they will be imprisoned. My invention provides for either killing the animals by allowing them to fall into oil, water, or the like, in the bottom of the trap, or by keeping them alive and imprisoned in the trap until the trap is emptied. My trap is simple in construction, is extremely durable and requires little attention as there are no springs, trap doors, or the like, to be set and consequently get out of order. In the drawing, Figure I is a vertical section of the trap.

Fig. II is a vertical section taken at right angles of Fig. I.

Fig. III is a vertical section of the detachable upper member.

Fig. IV is a plan view of the upper member looking down upon it from above.

A designates the lower section of the trap within which is a compartment B in which the animals and insects caught by the trap are imprisoned or killed. This lower section has a floor 1 and flaring walls 2 converging toward the top of the compartment, said walls being preferably covered exteriorly with sand or otherwise suitably roughened so that animals or insects to be caught may have a good foothold in order to more readily mount the exterior walls of the trap. The walls 2 have at their upper ends a continuous outturned horizontal peripheral flange 3, said flange overhanging the flaring walls 2.

C designates the upper section of my trap, detachably supported by the lower section A, said upper section comprising a top or cover 4, vertical spacing ribs 5 and a guard member 6 adapted to rest upon and be inserted within the lower member A. This guard member 6 is preferably smooth and has an outwardly turned peripheral flange 7 adapted to rest upon the outwardly turned flange 3 of the lower section and also has an inwardly and downwardly extending tapered portion 8, whose upper edge meets the inclined walls 2 of the member A and makes an angle therewith. The walls of the tapered portion 8 provide inclined slides which extend downwardly from the flange 7 to the interior of compartment B. The spacing ribs 5 are joined at one end to the flange 7 of the guard 6 and support the top 4, being secured to the under side of the top whereby a substantially open peripheral runway R is provided, the overlying horizontal mating flanges 3 and 7 forming the floor or platform of the runway and the top 4 forming the roof or hood of the runway.

The guard 9 prevents an animal standing on the platform 7 getting access to the bait holder D for the purpose of removing the bait from the holder. This guard is secured to the under surface of the top 4 and has a continuous depending flange 10 located directly above the flaring guard flange 8. The bait holder D consists of a rod 11 loosely mounted in a hanger 12 secured to the under-surface of the guard 9, the hanger 12 having resilient spaced arms 13 bent upon themselves and suitably perforated to loosely receive the rod 11. The hanger arms are resilient so that they may be spaced apart sufficiently to permit the removal and re-insertion of the bait rod 11 and it will be apparent that when the bait has been impaled upon the rod and the rod is inserted in the hanger arms the bait cannot be displaced therefrom due to efforts of animals to remove it. The substantially open runway all around the periphery of the trap is provided so that an animal climbing the walls of the trap at any point may enter the trap and need not go to a particular ingress opening in order to enter the trap.

The bait holder D is located centrally of the runway R and in such a position that animals standing on the stationary platform 7 of the runway must reach interiorly and upwardly to the bait holder. Consequently an animal standing on the runway will attempt to get the bait but cannot do so due to the guard flange 10 and will lose its balance and fall from the platform and down the smooth inclined slide formed by one of the walls of the tapered portion 8 and into the compartment B of the bottom member. To reach the bait, the animals will climb the inclined side walls of compartment B and pass onto the platform 7 at the top of the tapered portion 8.

For the purpose of catching insects in my trap, one or more of the flaring walls 2 of the lower section A of the trap is provided with small entrance openings 15 of insufficient size to admit an animal therethrough. Insects climbing up said wall or walls pass through said openings 15 and it will be apparent that inasmuch as the walls of the lower section flare outwardly from the upper ends and the walls of the upper member C located within the lower section flare oppositely to the flare of the lower member, there is no opportunity for the insects to escape from the trap. The insects therefore fall immediately to the bottom of the compartment B from which they cannot ascend due to the inclination of the walls 2. Such insects as enter from the platform 7 of the trap will fail at once from the inclined wall of the guard member into the compartment B.

The upper and lower sections of the trap are detachably secured to each other by suitable fastenings 16, preferably spring arm latches, which are attached to the under side of the top 4 and engage the bottom of the outturned flange 3. Such a latch is simple, automatic and durable and may be quickly operated. A handle 17 is preferably provided on the upper member C, by which the trap may be carried.

When it is desired to clean the trap, remove animals therefrom, renew bait, etc., the trap can be opened by releasing the spring latch 16 and lifting off the top member. When it is desired to kill the animals when caught in the trap, the compartment B is partly filled with water, oil, etc., into which the animals will fall. The animals may be caught alive in the trap either in the manner previously described or by providing suitable bait on the bottom of the compartment.

From the foregoing description it is seen that the trap is self-setting, and that when once baited the bait will remain in service for a long period, owing to the inability of an animal to remove it and the inaccessibility of the bait to other animals such as dogs, cats, etc. Another advantage of my trap is that a great many animals may be caught in it before any of them need to be removed.

I claim:

1. In a trap of the character described a lower section comprising a receptacle having side walls which converge toward the top of the receptacle and a continuous top flange extending outwardly at the top of said receptacle, and an upper section comprising a continuous flaring guard flange and a continuous horizontal top flange extending outwardly from the top of said flaring guard flange and seated upon the top flange of said receptacle, said continuous flaring guard flange being arranged within the upper portion of the receptacle to provide slides which extend downwardly from the top flanges, said upper section also including a cover, ribs connecting said cover to the superimposed top flange, a continuous guard flange depending from said cover and located directly above said flaring guard flange, said guard flanges being separated from each other to provide a continuous inlet above said flaring guard flange, and spring latches whereby said upper section is detachably secured to said lower section.

2. A trap of the character described comprising a receptacle having side walls which converge toward the top of the receptacle and having an outturned flange at its upper edge, a guard member having an outturned peripheral flange lying upon the first mentioned flange and also having a tapered portion extending downwardly from said peripheral flange and into said receptacle, a cover above said guard, separating ribs joining said guard to said cover, a latch device detachably securing said guard and cover to said receptacle, said latch device being resilient and held against the under surface of the outturned flange of the receptacle.

3. A trap of the character described comprising a receptacle having inclined side walls converging toward the top of the receptacle, an animal supporting platform at the top of said inclined side walls, a continuous flaring guard flange extending downwardly from said platform to provide slides which extend into said receptacle, a cover located above said flaring guard flange, said cover having a continuous depending flange located adjacent to said flaring guard flange but separated therefrom to provide a continuous inlet above said flaring guard flange, and connecting members whereby said depending flange is separated from said flaring guard flange.

In testimony that I claim the foregoing I hereunto affix my signature.

LOUIS HAEGE.